United States Patent [19]
Bossen et al.
[11] 3,812,336
[45] May 21, 1974

[54] DYNAMIC ADDRESS TRANSLATION SCHEME USING ORTHOGONAL SQUARES

[75] Inventors: Douglas C. Bossen, Wappingers Falls; Connor F. Haugh; Mu-Yue Hsiao, both of Poughkeepsie, all of N.Y.

[73] Assignee: International Business Machines Corporation, Armonk, N.Y.

[22] Filed: Dec. 18, 1972

[21] Appl. No.: 316,163

[52] U.S. Cl. .......................................... 235/153 AM
[51] Int. Cl. ........................ G11c 29/00, G06f 11/12
[58] Field of Search.... 235/153 AM; 340/146.1 AL, 340/146.1 R, 172.5, 173 R

[56] References Cited

UNITED STATES PATENTS 3,331,058 7/1967 Perkins, Jr. .................. 235/153 AM
3,644,902 2/1972 Beausoleil .................... 340/146.1 R

OTHER PUBLICATIONS

Beausoleil, Maintenance for Memory with Error Correction, IBM Technical Disclosure Bulletin, Vol. 11, No. 12, May 1969, pp. 1692–1693.

*Primary Examiner*—Charles E. Atkinson
*Attorney, Agent, or Firm*—James E. Murray

[57] ABSTRACT

This specification describes a scheme for swapping bits between words of a memory when a multiple error condition is detected in any word of the memory by a single error correction and multiple error detection system monitoring the memory. The swapping of the bits between the words is done in terms of orthogonal Latin squares insuring that no combination of any two bits is repeated in the reconfigured words. This insures that with a single swapping of the bits the detected multiple error condition is eliminated and makes it highly unlikely that another double error condition will be produced by the swapping.

8 Claims, 5 Drawing Figures

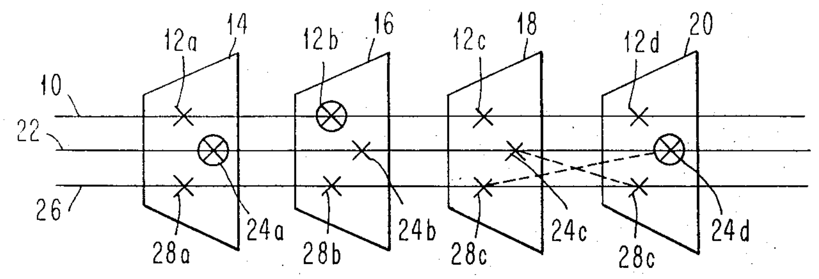
FIG. 1
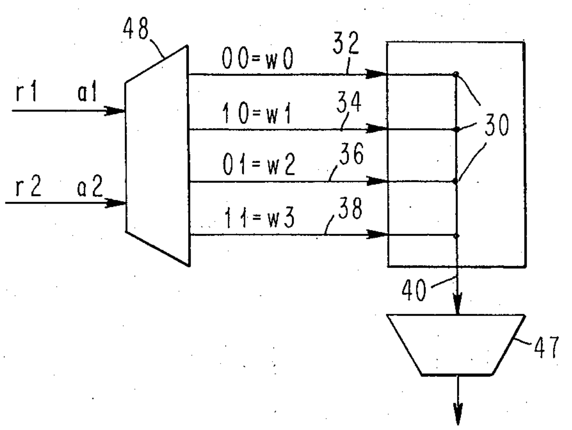
FIG. 2
FIG. 3
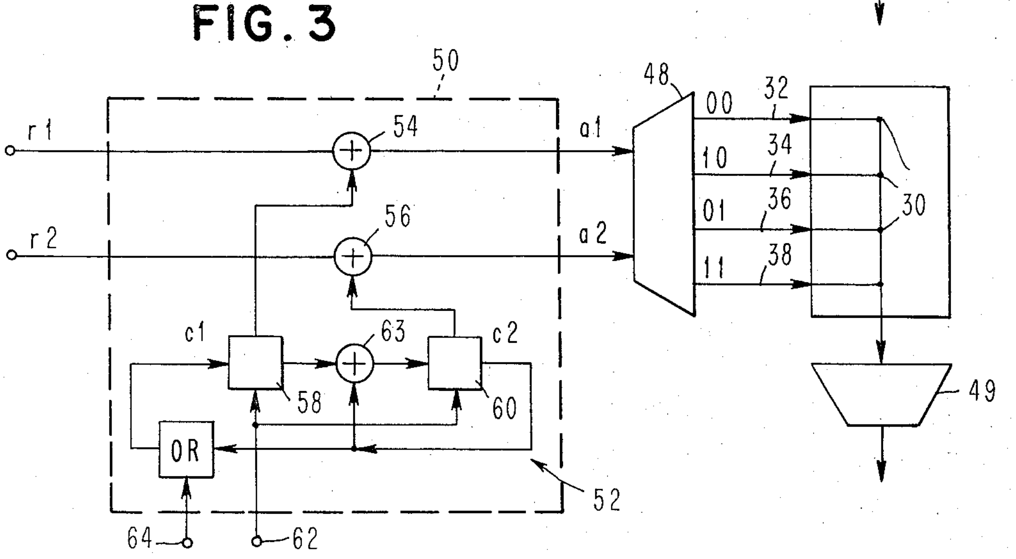
FIG. 4
| r1r2 \ c1c2 | 00 | 10 | 01 | 11 |
|---|---|---|---|---|
| 00 | 00 | 10 | 01 | 11 |
| 10 | 10 | 00 | 11 | 01 |
| 01 | 01 | 11 | 00 | 10 |
| 11 | 11 | 01 | 10 | 00 |
→
| r1r2 \ c1c2 | 00 | 10 | 01 | 11 |
|---|---|---|---|---|
| 00 | 0 | 1 | 2 | 3 |
| 10 | 1 | 0 | 3 | 2 |
| 01 | 2 | 3 | 0 | 1 |
| 11 | 3 | 2 | 1 | 0 |

DYNAMIC ADDRESS TRANSLATION SCHEME USING ORTHOGONAL SQUARES

BACKGROUND OF THE INVENTION

The present invention relates to the automatic skewing of addresses in a memory to change memory words with uncorrectable errors into memory words with errors that can be corrected by error correction schemes.

Error correction and detection schemes for encoding data are known to detect more errors then they are capable of correcting. For instance, a 64 data bit word can be provided with a single error correction and a double error detection capability by using eight check bits which are stored in the same word location in memory as the 64 data bits. A failure of any single one of the 72 cells which store the data and check bits can be corrected by error correcting circuitry. This same circuitry can also be used to detect double errors existing in the word but generally will not correct the multiple errors. That is, if a single bit fails the particular defective bit can be identified and, therefore, corrected. If two bits fail the occurrence of the failure can be detected but the failing bits generally cannot be pinpointed and, therefore, cannot be corrected.

The term generally has been used in connection with double error correction because some of the single error correction codes do correct certain types of multiple errors such as errors in adjacent bit positions. However, while these more powerful codes are useful in particular situations, they are not a panacea since not all double errors will occur in a correctable pattern. To generalize then and repeat what has already been said, an error correction system will detect a greater number of errors than it has the capability of automatically correcting.

To take advantage of this capacity of an error correction scheme to detect more errors than it can correct, Beausoleil U.S. Pat. No. 3,644,902 suggests a means for changing errors that are detectable but uncorrectable into errors that are both detectable and correctable. In this patent, a memory unit is made up of a plurality of arrays each containing all the bits for one bit position in the memory unit. These arrays are each addressed through a decoder so that the proper bit of any word is selected from each array when the word is addressed. The Beausoleil patent suggests that, when multiple errors are to be avoided, circuitry be employed that permanently modifies the address supplied to the decoders to swap bits between words by physically swapping the arrays and thereby change words with uncorrectable errors into words with correctable errors.

BRIEF DESCRIPTION OF THE INVENTION

In accordance with the present invention an address modification scheme is proposed to perform this swapping electronically and dynamically. In this scheme the address supplied to the decoder of any particular bit array is modified by logic circuitry as a function of data stored in a shift register associated with the particular bit position of the words in the memory unit. When multiple errors are detected in a word, the date stored in each of the registers is changed to change the bits making up the words of the memory to thereby eliminate the detected multiple error condition.

Preferably, the shift register for each bit position is a linear feedback shift register (LSFR) and the logic circuitry controlled by each of the registers includes an Exclusive OR gate for each of the inputs of the decoder of the particular bit position. Each of the Exclusive OR gates accepts one digit of the word address and the output of one of the stages of the linear feedback shift register and supplies its output to one of the inputs of the decoder. Now, if a different Galois field number is stored in each of the shift registers starting with zero in the shift register of the first bit position and proceeding in the Galois field number sequence to the highest number needed in the shift register of the last bit position, then the swapping of the bits between the words can be done in terms of orthogonal Latin squares. The swapping is accomplished by stepping each of the shift registers except the shift register of the first position one Galois number each time a multiple error is detected by the error correction system. This assures that the detected multiple error in the single word will be separated into single errors at two or more different addresses without the necessity of testing the memory to locate the memory positions of the failing bits.

Therefore, one advantage of the scheme is that it eliminates a detected multiple error condition in one try and is unlikely to introduce other multiple error conditions in the process. Another advantage is that only minor changes are required in a memory to obtain this automatic skewing of addresses. Basically, all that has to be done is to add a shift register and Exclusive OR gates for each bit position in the memory unit. A final advantage of this scheme is that it permits the use of bad bit chips in a memory without any loss in the number of bits. This is clearly superior to other schemes for using bad bit chips such as the three fourth or seven eighth good bit schemes that are used where the errors are confined to one fourth or one eighth of a chip and the remaining three fourths or seven eighths are then employed in the memory or in error mapping schemes where bad bits are mapped and the data intended to be stored there are stored in other locations.

Therefore, it is an object of the present invention to provide a scheme for swapping bits in memory words to change uncorrectable error conditions into correctable error conditions.

Another object of the present invention is to provide a memory capable of using bad bit memory chips.

Further objects of the invention are to automatically compensate for multiple errors in memories and to do so with a minimum of additional structure.

The foregoing and other objects, features and advantages of the present invention will be apparent from the following description of a preferred embodiment of the invention as illustrated in the accompanying drawings, of which:

DESCRIPTION OF THE DRAWINGS

FIG. 1 is a schematic representation showing how multiple errors in a single word can be changed into single errors in two or more words;

FIG. 2 illustrates an array addressed by a decoding network;

FIG. 3 shows an array with a translation mechanism for changing the address applied to the array into a Galois field element representation form;

FIG. 4 is a table showing the relationship between the decoders of FIG. 1 and that of FIG. 2.

DETAILED DESCRIPTION OF THE INVENTION

Figure 5:
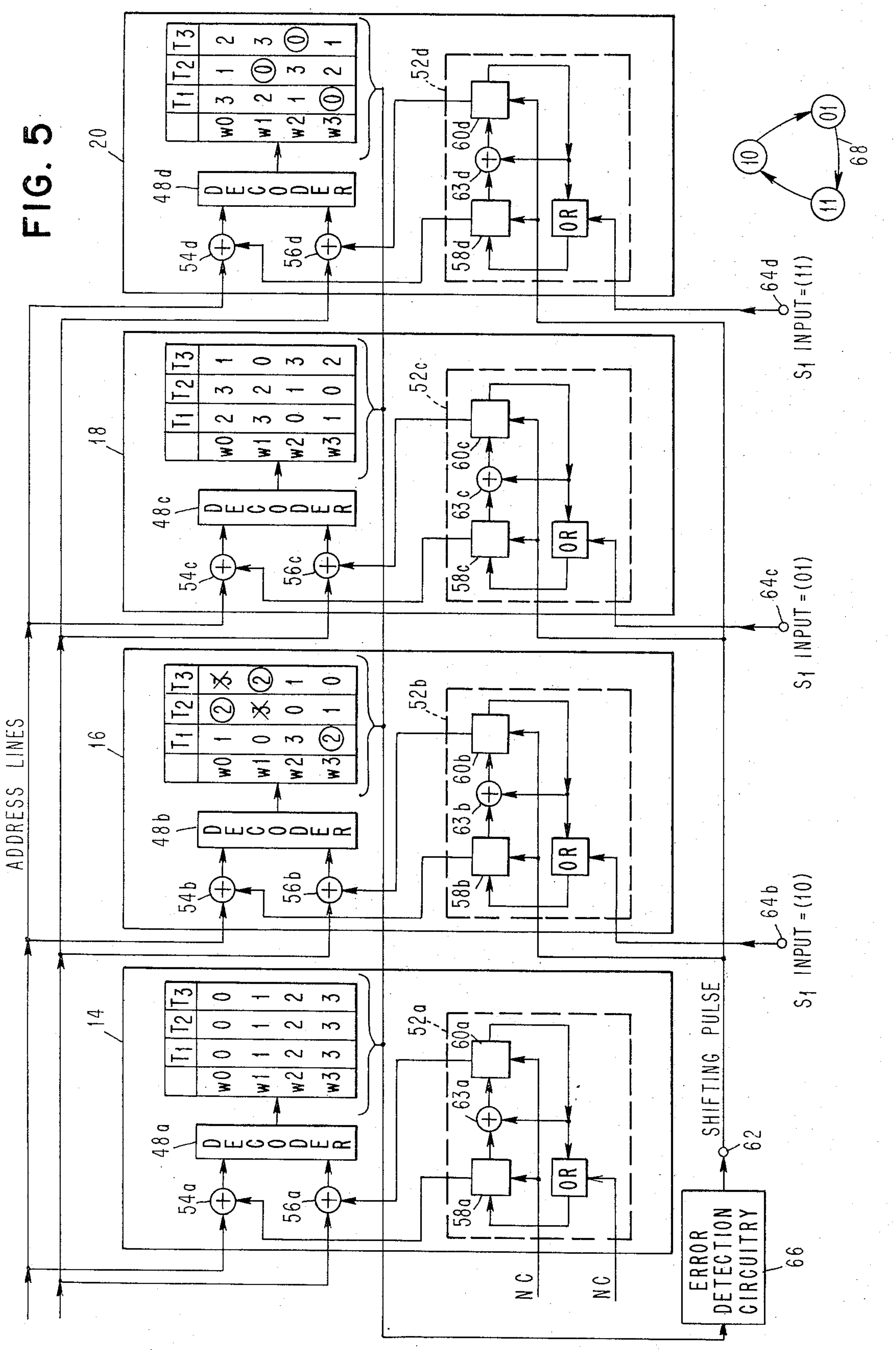
FIG. 5 is an embodiment of the present invention for a 4 × 4 memory.

The memory in FIG. 1 is comprised of a plurality of words each made up of four bits with each bit position of the word located in a specific array with bits from the same bit positions of other words. For instance, word 10 contains a bit 12 located in each of the arrays 14, 16, 18 and 20. Likewise, a word 22 contains a bit 24 located in each of the arrays and word 26 contains a bit 28 in each of the arrays. Such an arrangement is referred to as a one bit per BOM arrangement where BOM is the basic operating module or unit.

The described one bit per BOM memory arrangement is well known and has the advantage of being able to replace bad bits rather easily. For instance, suppose bit 12*b* is bad. The replacement of the array 16 with all good chips would return the memory to an operating condition. In modern memories replacement under the conditions described above is not necessary because they contain error detection and correction circuitry which will automatically correct data stored in any word having one bad bit. Such circuitry will also detect words having two or more bad bits but will not automatically correct the data in them. For instance, error detection circuitry would detect a double error in word 22 when bits 24*a* and 24*d* are bad, but would not be able to correct the error because it could generally not pinpoint the bad bits.

In Beausoleil U.S. Pat. No. 3,644,902 it is suggested that even in the case of multiple errors it would not be necessary to replace any one of the arrays 14 – 20 if the address to the bits could be skewed. That is, the words would not address the same bit in each of the arrays. For instance, a double error could be eliminated in word 22 by having the word 22 contain bit 28*d* instead of 24*d* and word 26 would then contain bit 24*d* instead of bit 28*d*. Thus, each of the words 10, 22 and 26 could contain only one error and the memory would be fully operable with a single error correction, double error detection system. The Beausoleil patent suggests that skewing can be accomplished by the physical rewiring of the memory or by the use of logic in the addressing scheme for the memory.

A typical memory array with addressing circuitry is shown in FIG. 2. In the array, bits 30 are conceptually arranged in a 4 × 1 matrix with each bit located at the intersection of one of the word lines 32 to 38 with bit line 40. One of the four word lines is selected by decoding addressing signals *r*1 and *r*2 through a decoding tree 48. If both *r*1 and *r*2 are binary 0 word line *w*0 is selected. If *r*1 is 1 and *r*2 is 0 word line *w*1 is selected. If *r*1 is 0 and *r*2 is 1 word line *w*2 is selected and, finally, if both *r*1 and *r*2 are 1 word line *w*3 is selected. In a read operation the bit 30 on the particular word line 32, 34, 36 or 38 would then be read out into sense amplifier circuits 49.

In accordance with the present invention, the word addressing scheme is modified by the addition of the translation means 50 shown in FIG. 3. The translation mechanism 50 comprises a two-stage linear feedback shift register 52 and two Exclusive OR circuits 54 and 56 for Exclusive ORing the data bits *c*1 and *c*2 stored in stages of the shift register with the address bits *r*1 and *r*2 of the word select decode signals. Now, the particular word line 0, 1, 2 or 3 on this array selected by the input signals *r*1 and *r*2 is dependent on the data stored in the shift register 52. If, for instance, the stages of the shift register both stored 0's, the decoding will be performed as previously described. Thus, if *r*1 and *r*2 are both 0, the 0 word line will be selected, and so forth. However, if either of the stages of the shift register does not store a 0, a different combination of word lines will be selected. For instance, suppose that the first stage of shift register 52 stores a 1 while the second stage of the shift register stores a 0, then if *r*1 and *r*2 are both 0, the inputs of the decoder a1 and a2 will be 1 and 0, respectively. This will, of course, select word line 1 of the memory.

The left hand table of FIG. 4 shows the resulant addresses brought about by the various combinations of *r*1, *r*2, *c*1 and *c*2 while the right hand side of the table shows which words are selected by the various combinations of *r*1, *r*2, *c*1 and *c*2.

The numbers 00, 10, 01 and 11 represent a Galois field element sequence. It is well known that the linear shift register such as the two bit shift register 52 will produce numbers in a Galois field element sequence as it shifts from position to position. Thus, a linear shift register can be considered a Galois counter. To see how it counts let us first assume that a 1 is stored in the first stage 58 of the register and a 0 is stored in the second stage 60 of the register. Then when a shifting pulse is applied to terminal 62 the data in the stages is shifted. The shifting of the data causes the data stored in stage 60 to be transferred to stage 58 while the data in stage 58 is Exclusive ORed in Exclusive OR 63 with the data in stage 60 and the resultant placed in stage 60. Thus, after the shifting is complete a 0 is stored in stage 58 and a 1 is stored in stage 60. Now is another shifting pulse is applied to terminal 62 the data is changed again this time to binary 1's in both stages 58 and 60. Finally, if another pulse is applied to terminal 62 the shift register is returned to the original condition with a binary 1 stored in the first stage 58 and a binary 0 stored in the second stage. Therefore, it can be seen that the data in the shift register changes in accordance with the flow diagram 68 in FIG. 5.

The three numbers in the sequence constitute three of the four numbers in the Galois field element sequence discussed above. With them a memory having four words of four bits each is provided with a multiple error correction capability. Each bit of any word w0 to w3 of the memory is located on a different array and each array is addressed by word address lines through a Galois transformation coder 50 and a decoder 48.

In FIG. 5 *w*0, *w*1, *w*2 and *w*3 represent the words requested by the word decode sequences *r*1 and *r*2 while the numbers in the columns *t*1, *t*2 and *t*3 are those actually addressed in the particular array 14, 16, 18 or 20. Two binary 0's are stored in the shift register 52 of the array 14 containing the first bit of each word *w*0 to *w*3 of the memory and the data in that shift register is never changed. Thus, the inputs *r*1 and *r*2 on the address lines pass through Exclusive OR gates 54*a* and 56*a* unchanged and the first bit of each of the words is always the same bit as shown in columns *t*1, *t*2 and *t*3. Initally, a binary 1 is stored in the first stage 58b and a binary 0 is entered into the second stage 60*b* of the card 16 containing the second bit of each of the words of the memory. This rearranges the bits of the words as shown in column t1 so that when $r1$ and $r2$ address word $w0$ the bit from word w1 is obtained and so on. A different skewing of the bits occurs in card 18 where a 0 is stored in the first stage 58c and a 1 is stored in the second stage 60c and in word 20 where a 1 is stored in both stages of the shift register 52$d$. The result of the skewing is that the address bits $a1$ and $a2$ applied to the decoder are different for every array when the interrogating address bits $r1$ and $r2$ are identical for all the arrays.

The storage of the data in the shift register is accomplished by the application of a pulse to the terminals 64. First, a binary 1 is introduced at terminal 64$d$ and a shifting pulse applied to terminal 62. Then a binary 1 is entered at terminal 64$c$ and a second shifting pulse is applied to terminal 62 and, finally, a binary 1 is entered at terminal 64$b$ and a third shifting pulse is applied to terminal 62. After the third shifting pulse the shift registers 52$a$ to 52$d$ store data as outlined above.

Suppose now that a double error condition is detected in one of the words of the memory by the error detection circuitry 66 for the memory. Then a shifting pulse is applied to terminal 62 by the error detection circuitry 66 changing the data stored in each of the shift registers 52$b$ to 52$d$ in accordance with the sequence shown at 68. Thus, the data stored in card 16 changes from 10 to 01 and in card 18 from 01 to 11 and in card 20 from 11 to 10 while the data in card 14 remains unchanged. As you see, there is a complete realignment of the bits in the memory as shown in the columns marked T2 on all the cards. An example of how this would eliminate the double error condition can be seen by assuming that bit 2 on card 16 and bit 0 on card 20 fail. Thus, a double error condition exists in addressed word 3. With the application of the stepping pulse to the shift registers 56$b$ to 56$d$ these failing bits would no longer both be in word 3, but one would be in word 0 and the other in word 1 resulting in two single error situations which can be corrected by the double error detection and single error correction system. Again suppose that an additional failure occurs in bit 3 of card 16 resulting in a double error condition in addressed word 1 involving bit 3 in card 16 and bit 0 in card 20. Then a second shifting pulse is applied to the words so that the arrangement of the bits in each of the cards is shown in column T3 on the cards. An examination of column T3 shows that each of the words has a single error which can be corrected by the error correction system.

Thus, it can be seen that by using binary numbers in the Galois field transformation sequence by stepping the numbers along in the sequence as illustrated, uncorrectable errors can be changed to errors that can be corrected by the error correcting system. Further, if, after the first double error situation is corrected, a second double error situation occurs and the memory is again reorganized you can see that the first situation is not reinstituted by the second reorganization. This is because the address sequence generated by the Galois transformation sequence is in terms of orthogonal Latin squares. Two Latin squares are orthogonal and when combined every letter of one square occurs once and only once with every letter of the other. It should be apparent that this is what happens in the described stepping sequence. If a third double error was to occur and a third stepping pulse was applied to terminal 62, the initial error condition would be repeated. However the particular memory to which the correction was applied is quite rudimentary and is used here because it most clearly points out the advantages and operation of the present invention. Actually, the numbers of bits on a card would be in the hundreds or thousands requiring Galois field transformation sequences with long sequences of binary numbers to perform the described error correction functions. Thus, the possibility of the need to repeat only one combination of numbers in the sequence is quite remote. A description of Galois field transformation sequences can be found in W. W. Peterson, Error Correcting Codes, 1961 MIT Press, Cambridge, Mass., while a description of orthogonal Latin squares can be found in H. B. Mann, Design and Analysis of Experiments, 1949 Dover Publications, N.Y.

While the invention has been particularly shown and described with reference to a preferred embodiment thereof, it will be understood by those skilled in the art that the above and other changes in form and details may be made therein without departing from the spirit and scope of the invention.

What is claimed is:

1. In a memory unit made up of a plurality of arrays each array containing all the bits for one bit position in the memory unit and having a decoder to select one of the bits in each of the arrays to form an information unit in the memory when an identical information unit selection address is supplied to each of the arrays, the improvement comprising:

a single error correction multiple error detection means for the correction of a single error in the information units of the memory and for an output signal when a multiple error condition is detected in an information unit;

a different shift register means associated with each of the decoders and coupled to said single error correction multiple error detection means for responding to said output caused by the detection of a multiple error condition in an information unit by changing the data stored in the shift register means; and an Exclusive OR circuit means for supplying an output to each of the inputs of the decoder with which it is associated and receiving one input from one of the stages of the shift register with which the decoder is associated and another input from a digit of the information unit selection address whereby the changes in data stored in the shift registers changes the bits making up the flawed information unit so as to eliminate the multiple error detected.

2. The memory unit of claim 1 wherein said shift registers are Galois counters each storing a different binary number in a Galois field transformation sequence.

3. The structure of claim 2 wherein said Galois field counters are a linear feedback shift registers.

4. A memory unit made up of a plurality of arrays with each array having a decoder to select bits from the arrays to form an information unit of the memory when an identical binary number called an unit selection address is supplied to each of the arrays, the improvement comprising:

an error detection and correction means capable of detecting more errors than it can correct in an information unit for providing an output signal when an uncorrectable error condition exists in an information unit;

translation means associated with each of the arrays for receiving the information unit selection address and in response thereto supplying to a different binary number in Galois field transformation sequence to each of the decoders; and means responsive to said output signal of the error detection and correction means for changing the binary numbers supplied to the decoders by the translation means to different numbers in the Galois field transformation sequence when an uncorrectable error is detected.

5. The memory unit of claim 4 wherein said translation means comprises:

a different linear feedback shift register means for each decoder coupled to the error detection and correction means for responding to said output signal caused by the detection of uncorrectable errors in an information unit by changing the data stored in the linear feedback shift register means; and an Exclusive OR circuit for supplying an output to each of the inputs of the decoder and receiving one input from one of the stages of the shift register with which the decoder is associated and another input from the digit of the information unit selection address for the memory unit whereby upon detection of an uncorrectable error data in the shift register is changed so as to change bits making up the flawed word.

6. The memory unit of claim 5 wherein said error correction means is a single error correction, multiple error detection system.

7. The memory unit of claim 6 wherein each array supplies one bit for a word of the memory.

8. The memory unit of claim 7 wherein the data in one of the shift registers is zero and the shift register is not changed when a multiple error is detected.

* * * * *